US012705781B2

(12) United States Patent
Holmes et al.

(10) Patent No.: US 12,705,781 B2
(45) Date of Patent: Aug. 11, 2026

(54) EFFICIENT LOCAL NORMALIZATION FOR DFS

(71) Applicant: QUALCOMM Incorporated, San Diego, CA (US)

(72) Inventors: Samuel Benjamin Holmes, Sterling, MA (US); Jonathan Wicks, Lafayette, CO (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 18/494,654

(22) Filed: Oct. 25, 2023

(65) Prior Publication Data

US 2025/0139806 A1 May 1, 2025

(51) Int. Cl.

| | |
|---|---|
| ***G06T 7/70*** | (2017.01) |
| ***G06T 1/00*** | (2006.01) |
| ***G06T 5/50*** | (2006.01) |
| ***G06T 5/70*** | (2024.01) |

(52) U.S. Cl.

CPC .............. *G06T 7/70* (2017.01); *G06T 1/0007* (2013.01); *G06T 5/50* (2013.01); *G06T 5/70* (2024.01)

(58) Field of Classification Search

CPC ........... G06T 7/70; G06T 1/0007; G06T 5/50; G06T 5/70; G06T 2207/10012; G06T 2207/10021; G06T 2207/20016; G06T 5/94; G06T 7/596

USPC .......................................................... 382/103

See application file for complete search history.

(56) References Cited

U.S. PATENT DOCUMENTS

| | | | | |
|---|---|---|---|---|
| 8,712,095 | B2 | 4/2014 | Gaddy | |
| 9,552,633 | B2 * | 1/2017 | Sahu | H04N 13/106 |
| 10,217,197 | B2 | 2/2019 | Mantiuk et al. | |
| 2014/0177927 | A1 * | 6/2014 | Shieh | G06T 7/593 382/154 |
| 2017/0213388 | A1 | 7/2017 | Margolis et al. | |
| 2018/0130221 | A1 * | 5/2018 | Kim | G06T 7/174 |
| 2020/0349376 | A1 | 11/2020 | Raveendran | |
| 2021/0065393 | A1 * | 3/2021 | Jeon | G06N 3/0455 |

(Continued)

FOREIGN PATENT DOCUMENTS

| | | | |
|---|---|---|---|
| CN | 114862883 | A | 8/2022 |
| WO | 2022072884 | A1 | 4/2022 |

OTHER PUBLICATIONS

International Search Report and Written Opinion—PCT/US2024/050661—ISA/EPO—Jan. 29, 2025.

*Primary Examiner* — Amandeep Saini

(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for efficient local normalization for DFS. A processor may determine a target granularity based on at least one of a first image buffer or a second image buffer. The processor may determine a partial image pyramid based on the target granularity and at least one of the first image buffer or the second image buffer. The processor may sample the partial image pyramid based on the target granularity. The processor may determine a midpoint normalization value based on the sampled partial image pyramid. The processor may normalize at least one of the first image buffer or the second image buffer based on the midpoint normalization value.

30 Claims, 9 Drawing Sheets

(56) References Cited

U.S. PATENT DOCUMENTS

2023/0057658 A1 2/2023 King
2023/0147244 A1 5/2023 Banerjee et al.
2024/0273739 A1* 8/2024 Park .......................... G06T 7/50

* cited by examiner

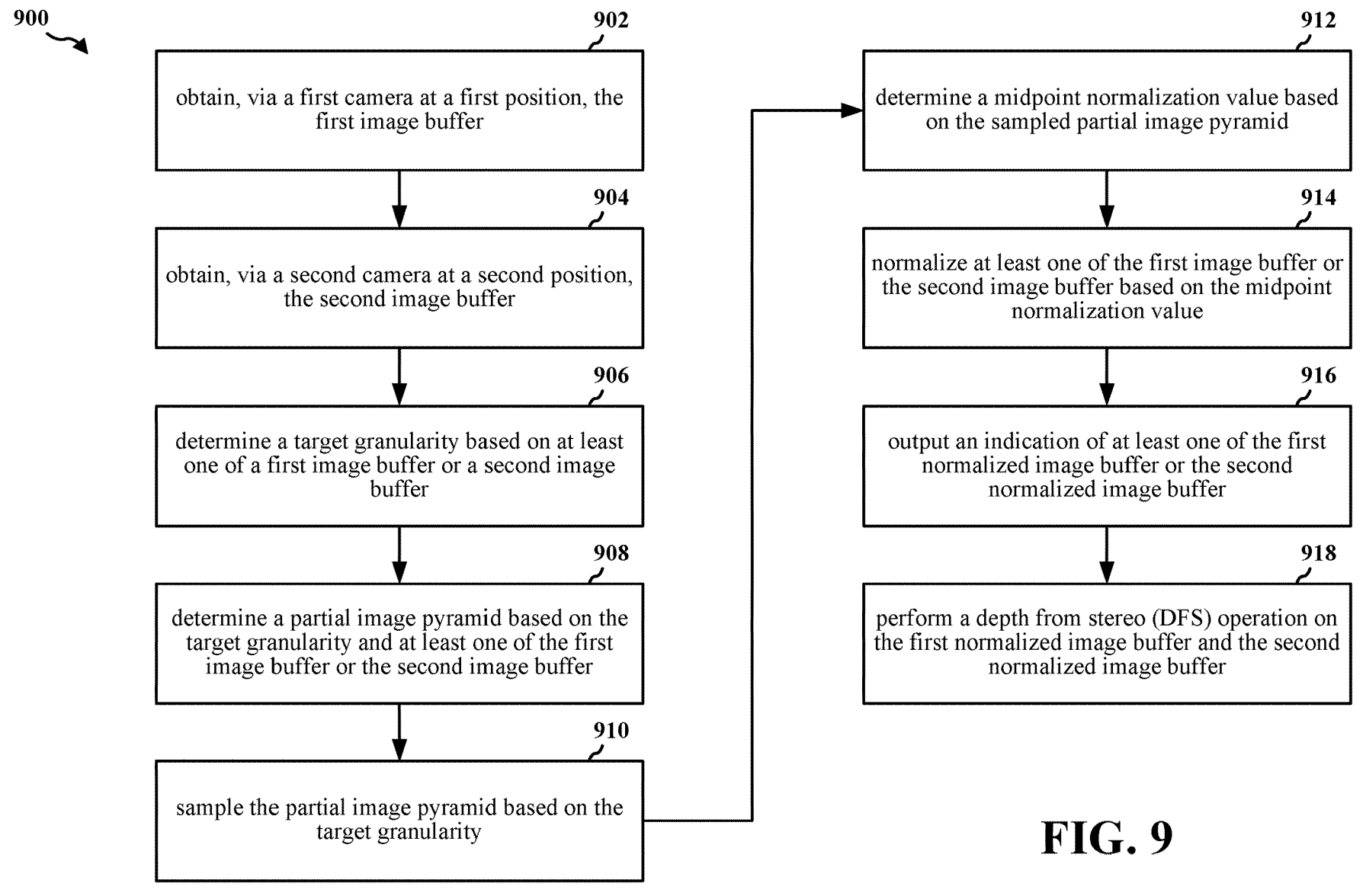

900

902 obtain, via a first camera at a first position, the first image buffer 904 obtain, via a second camera at a second position, the second image buffer 906 determine a target granularity based on at least one of a first image buffer or a second image buffer 908 determine a partial image pyramid based on the target granularity and at least one of the first image buffer or the second image buffer 910 sample the partial image pyramid based on the target granularity 912 determine a midpoint normalization value based on the sampled partial image pyramid 914 normalize at least one of the first image buffer or the second image buffer based on the midpoint normalization value 916 output an indication of at least one of the first normalized image buffer or the second normalized image buffer 918 perform a depth from stereo (DFS) operation on the first normalized image buffer and the second normalized image buffer

FIG. 9

EFFICIENT LOCAL NORMALIZATION FOR DFS

TECHNICAL FIELD

The present disclosure relates generally to processing systems, and more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques for depth from stereo (DFS) may not address luminance changes between a left image and a right image, which may cause a signal-to-noise issue. There is a need for improved techniques for addressing luminance changes between a left image and a right image.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes a memory; and a processor coupled to the memory and, based on information stored in the memory, the processor is configured to: determine a target granularity based on at least one of a first image buffer or a second image buffer; determine a partial image pyramid based on the target granularity and at least one of the first image buffer or the second image buffer; sample the partial image pyramid based on the target granularity; determine a midpoint normalization value based on the sampled partial image pyramid; and normalize at least one of the first image buffer or the second image buffer based on the midpoint normalization value.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 is a flowchart of an example method of display processing in accordance with one or more techniques of this disclosure.

DETAILED DESCRIPTION

Figure 1:
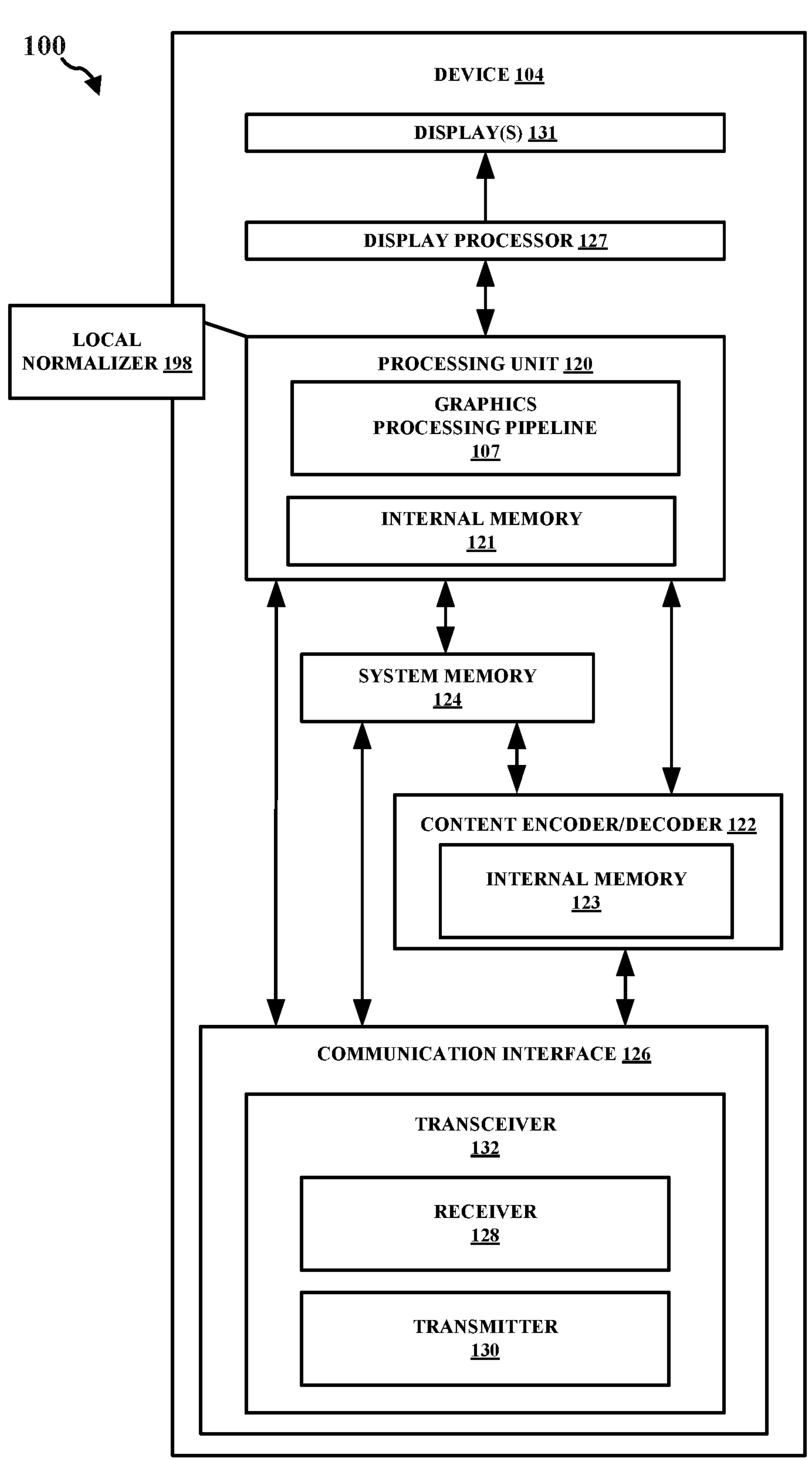
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

A device (e.g., an XR device) may include a left camera and a right camera that capture a left image and a right image of an environment. The device may present the left image on a left display of the device and the right image on a right display of the device, where the left image and the right image may be viewed by a user. The left image may have a first luminance and the right image may have a second luminance, where the first luminance may be different from the second luminance. A difference between the left image and the right image may be referred to as a luminance shift. The luminance shift may be due to various factors, such as different positions/orientations of the left camera and the right camera, different exposure times of the left camera and the right camera, minute differences in capture times of the left image and the right image, etc. When the luminance shift between the left image and the right image is larger than a luminance of trackable features in the left image and the right image, the luminance shift may prevent the device from successfully performing depth from stereo (DFS) which may be utilized to drive video see through (VST) experiences for XR. Furthermore, the luminance shift may be visually jarring to a user of the device when the user views the left image and the right image.

Various technologies pertaining to efficient normalization for depth from stereo (DFS) are described herein. In an example, an apparatus (e.g., a graphics processor) determines a target granularity based on at least one of a first image buffer or a second image buffer. The apparatus determines a partial image pyramid based on the target granularity and at least one of the first image buffer or the second image buffer. The apparatus samples the partial image pyramid based on the target granularity. The apparatus determines a midpoint normalization value based on the sampled partial image pyramid. The apparatus normalizes at least one of the first image buffer or the second image buffer based on the midpoint normalization value. Vis-à-vis normalizing at least one of the first image buffer or the second image buffer based on the midpoint normalization value, the apparatus may improve a quality of a DFS process in a low light and/or low feature strength region of an image by preventing luminance deltas from overshadowing trackable features. Furthermore, the above-described technologies may utilize graphics processor hardware and fast paths to maintain high performance and low latency. Additionally, the above-described technologies may automatically handle variations in input surface dimensions and camera field of views.

Block matching operations used for motion estimation and depth from stereo (DFS) may be susceptible to errors due to luminance changes between reference and target images. DFS used for video see through (VST) may often include luminance changes between left and right eye images. In one aspect described herein, a device may perform local normalization of input buffers prior to DFS. First, a target granularity may be determined and then local mean buffers may be produced at that granularity by producing a partial multum in parvo (MIP) pyramid. Bilinear sampling on the local mean buffers may then be utilized to produce per-pixel midpoint normalization. This may improve DFS quality in low light and low feature strength regions by preventing luminance deltas from overshadowing trackable features. Aspects presented herein may also utilize GPU hardware and fast paths to maintain high performance and low latency. A partial MIP chain may be used to find a local mean of image regions and hardware (HW) bilinear support may be applied to a target MIP level to smoothly interpolate between local regions, providing a per-pixel local normalization. Aspects presented herein may automatically handle variation in input surface dimensions and camera field of view.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

A user may wear a display device in order to experienced extended reality (XR) content. XR may refer to a technology that blends aspects of a digital experience and the real world. XR may include augmented reality (AR), mixed reality (MR), and/or virtual reality (VR). A device that is capable of presenting XR content may be referred to as an XR device. In AR, AR objects may be superimposed on a real-world environment as perceived through the display device. In an example, AR content may be experienced through AR glasses that include a transparent or semi-transparent surface. An AR object may be projected onto the transparent or semi-transparent surface of the glasses as a user views an environment through the glasses. In general, the AR object may not be present in the real world and the user may not interact with the AR object. In MR, MR objects may be superimposed on a real-world environment as perceived through the display device and the user may interact with the MR objects. In some aspects, MR objects may include "video see through" with virtual content added. In an example, the user may "touch" a MR object being displayed to the user (i.e., the user may place a hand at a location in the real world where the MR object appears to be located from the perspective of the user), and the MR object may "move" based on the MR object being touched (i.e., a location of the MR object on a display may change). In general, MR content may be experienced through MR glasses (similar to AR glasses) worn by the user or through a head mounted display (HMD) worn by the user. The HMD may include a camera and one or more display panels. The HMD may capture an image of environment as perceived through the camera and display the image of the environment to the user with MR objects overlaid thereon. Unlike the transparent or semi-transparent surface of the AR/MR glasses, the one or more display panels of the HMD may not be transparent or semi-transparent. In VR, a user may experience a fully-immersive digital environment in which the real-world is blocked out. VR content may be experienced through a HMD.

In motion estimation (ME) (which may also be referred to as an ME process or an ME operation), a device may determine motion vectors that describe a transformation of regions within a first two-dimensional (2D) image to corresponding locations within a second 2D image. The first 2D image and the second 2D image may be adjacent frames in a video sequence. The motion vectors may correspond to a whole image or specific parts of an image (e.g., rectangular blocks, arbitrarily shaped patches, or pixels). The motion vectors may be represented by a translational model or another model that approximates motion of a real video camera.

In depth from stereo (DFS) (which may also be referred to as a DFS process or a DFS operation), a device may determine disparity values at points in an image, where the disparity values used in conjunction with parameters (e.g., a field of view) of an image buffer may be indicative of depths of content in the image pair. An image buffer may refer to image data for a display (e.g., a left display or a right display of an HMD) that is stored prior to display. In DFS, the device may compute the disparity values by matching points between the image pair. DFS may be utilized to drive video see through (VST) experiences for XR.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a local normalizer 198 configured to determine a target granularity based on at least one of a first image buffer or a second image buffer; determine a partial image pyramid based on the target granularity and at least one of the first image buffer or the second image buffer; sample the partial image pyramid based on the target granularity; determine a midpoint normalization value based on the sampled partial image pyramid; and normalize at least one of the first image buffer or the second image buffer based on the midpoint normalization value. Although the following description may be focused on display processing, the concepts described herein may be applicable to other similar processing techniques. Furthermore, although the following description may be focused on depth from stereo (DFS), the concepts presented herein may also be applicable to other processing techniques as well, such as motion estimation.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
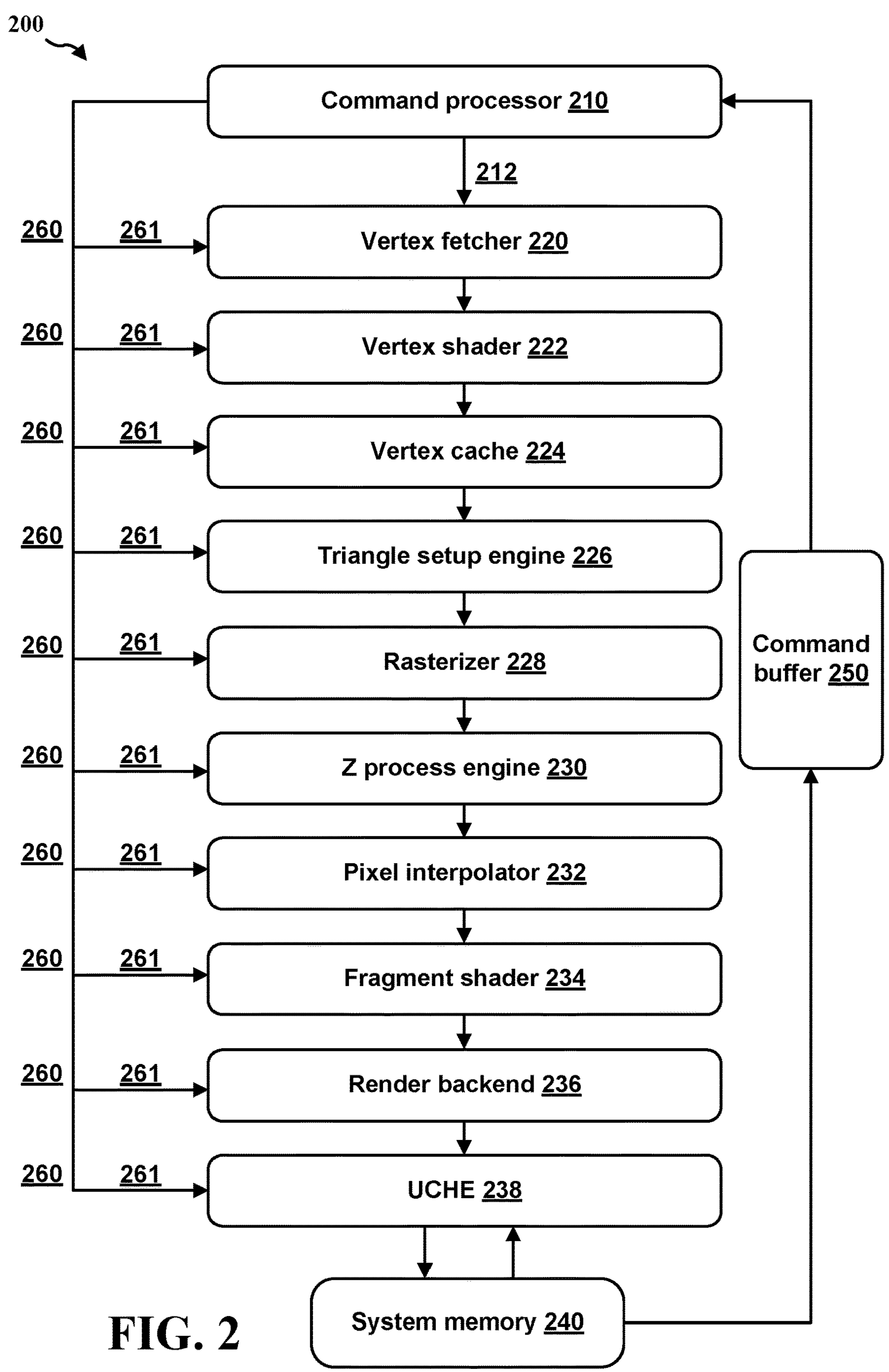
FIG. 2 illustrates an example graphics processor (e.g., a graphics processing unit (GPU)) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228. Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
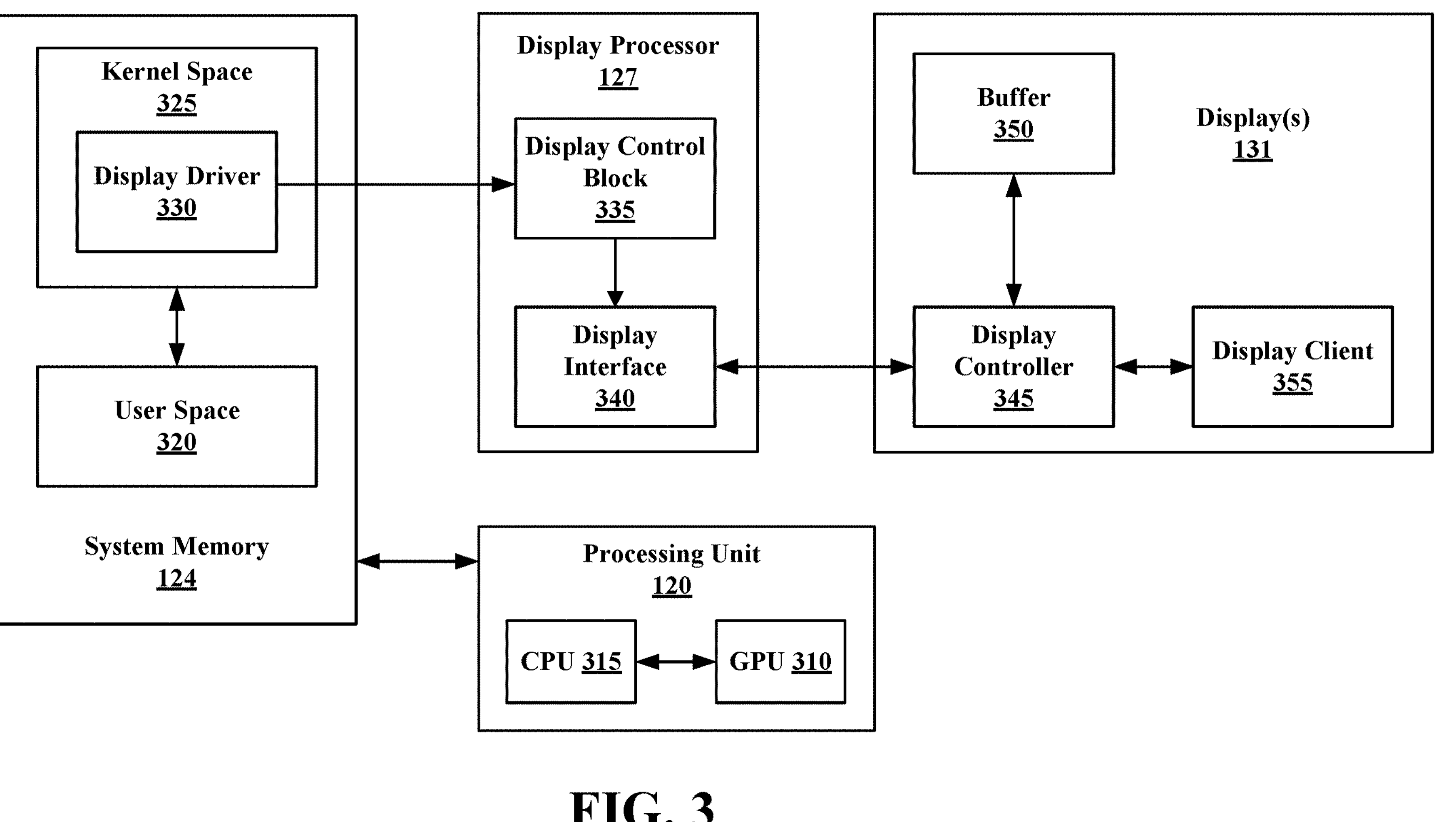
FIG. 3 illustrates an example display framework including a display processor and a display in accordance with one or more techniques of this disclosure.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

Figure 4:
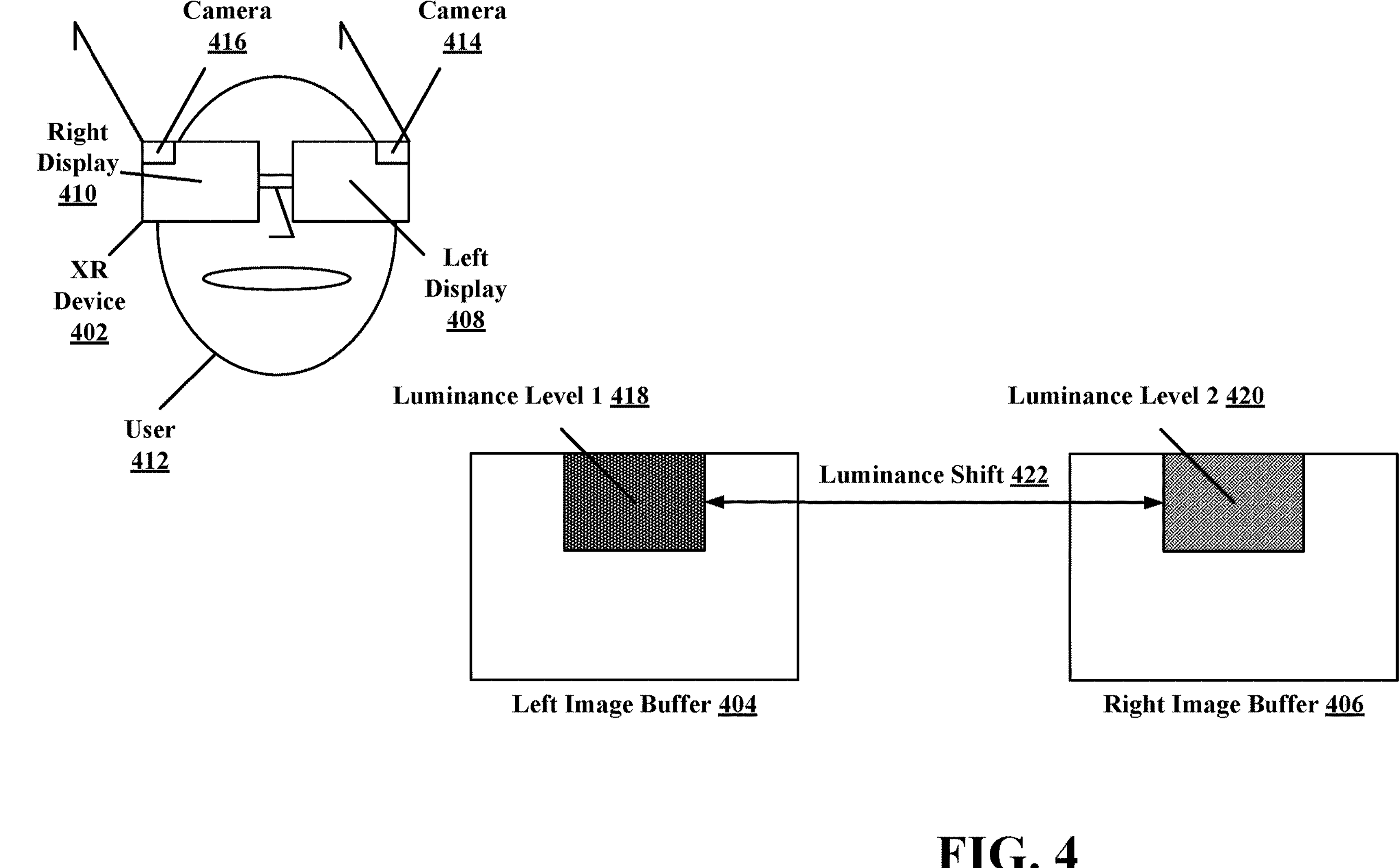
FIG. 4 is a diagram illustrating an example of an extended reality (XR) device and a left image buffer and a right image buffer captured by the XR device in accordance with one or more techniques of this disclosure.

FIG. 4 is a diagram 400 illustrating an example of an extended reality (XR) device 402 and a left image buffer 404 and a right image buffer 406 captured by the XR device 402 in accordance with one or more techniques of this disclosure. In an example, the XR device 402 may be or include the device 104. In an example, the XR device 402 may be or include an HMD or XR glasses. In an example, the XR device 402 may include a left display 408 and a right display 410. In another example, the XR device 402 may include a single display (not depicted in FIG. 4) with a first region associated with a left eye of the user 412 and a second region associated with a right eye of the user 412. The XR device 402 may also include a left camera 414 and a right camera 416. The left camera 414 and the right camera 416 may be video cameras. The left camera 414 may be located at a first position and/or oriented at a first angle on the XR device 402 and the right camera 416 may be located at a second position and/or oriented at a second angle on the XR device 402, where the first position and the second position may be different, and where the first orientation and the second orientation may also be different. The left camera 414 may be associated with the left display 408 and the right camera 416 may be associated with the right display 410 (described in greater detail below).

The XR device 402 may be worn on/over/near a head of the user 412. For example, when the XR device 402 is worn by the user 412, the left display 408 and the right display 410 may be positioned within several centimeters from a left eye of the user 412 and a right eye of the user 412, respectively. In one example, the left display 408 and the right display 410 may be liquid crystal displays (LCDs), light emitting diode (LED) displays, etc. In such an example, the left camera 414 and the right camera 416 may capture a left image and a right image, respectively, of an environment of the user 412 as the user wears the XR device 402, where the left image and the right image may correspond to what the user 412 would perceive if the user 412 was not wearing the XR device 402. The XR device 402 may present the left image and the right image on the left display 408 and the right display 410, respectively. The XR device 402 may also present XR content on/in the left image and/or the right image, where the XR content is generated by the XR device 402 and where the XR content is not physically present in the environment of the user 412 (i.e., video see through). For instance, the XR content may be superimposed on the left image and/or the right image. In an example, the XR content may appear to be part of the environment of the user 412.

A device (e.g., the XR device 402) may perform a sum of absolute differences (SAD) block matching operation and/or a sum of squared differences (SSD) block matching operation in order to facilitate performance of ME and/or DFS. However, SAD block matching operations and/or SSD block matching operations may be susceptible to errors due to changes between a reference image and a target image.

In an example, the left camera 414 of the XR device 402 and the right camera 416 of the XR device 402 may capture/generate the left image buffer 404 (i.e., a left image) and the right image buffer 406 (i.e., a right image), respectively. The left image buffer 404 and the right image buffer 406 may represent a view of an environment of the user 412 as perceived through a left eye and a right eye of the user. In an example, a region of the left image buffer 404 (or an entirety of the left image buffer 404) may be at a first luminance level 418 and a corresponding region of the right image buffer 406 (or an entirety of the right image buffer 406) may be at a second luminance level 420, where the first luminance level 418 may be different from the second luminance level 420. Stated differently, a luminance shift 422 (i.e., a luminance change, a luminance difference) may exist between the first luminance level 418 of the left image buffer 404 and the second luminance level 420 of the right image buffer 406. The luminance shift 422 may cause a signal-to-noise issue when the luminance shift 422 is larger than a strength of trackable features in the environment of the user 412. Thus, the luminance shift 422 may impact an ability of the XR device 402 to successfully perform DFS. For instance, the luminance shift may cause a corrupted DFS output. Furthermore, the luminance shift 422 may be visually jarring to the user 412 when the user views the left image buffer 404 and the right image buffer 406 concurrently (or nearly concurrently) on the left display 408 and the right display 410, respectively.

The luminance shift 422 may be caused by several factors. In one example, camera angle differences may exist between the left camera 414 and the right camera 416 which may cause the luminance shift. Stated differently, camera angle differences may exist due to re-using tracking cameras for VST, where different in-camera angles due to outward-facing camera placement may be large. In another example, an angle of incidence on wide-angle lenses (e.g., wide-angle lenses of the left camera 414 and the right camera 416) may cause similar areas in an environment to express different levels of light on a sensor (i.e., express different levels of light on a sensor of the left camera 414 and on a sensor of the right camera 416). In a further example, there may be content differences between the left image buffer 404 and the right image buffer 406 due to a positional shift between the left camera 414 and the right camera 416 which may cause different exposure/balancing. For instance, the luminance shift 422 may be caused by the left camera 414 and the right camera 416 capturing/generating the left image buffer 404 and the right image buffer 406 at slightly different times or the luminance shift 422 may be caused by the left camera 414 and the right camera 416 having different lens exposure times.

Figure 5:
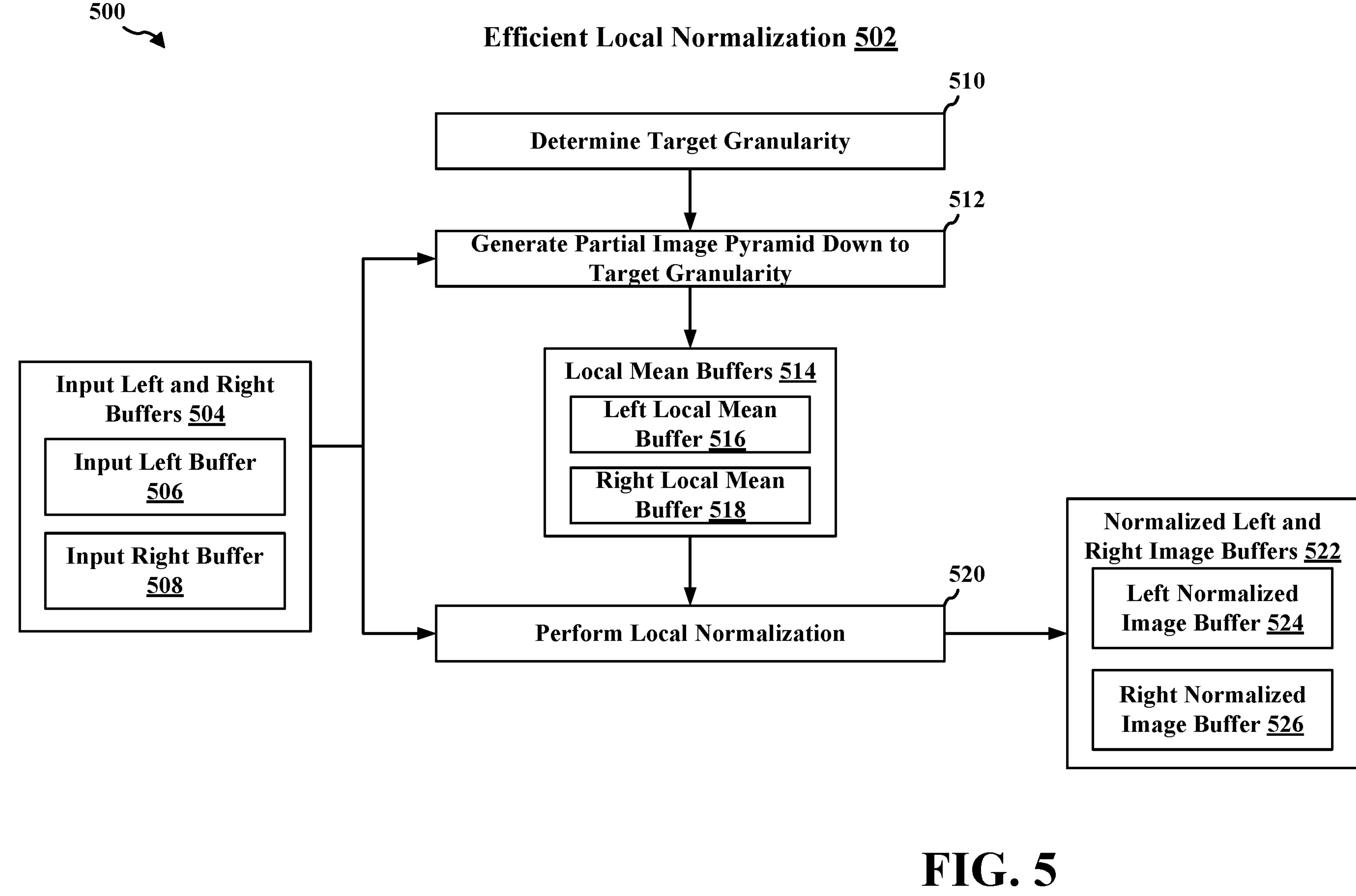
FIG. 5 is a diagram illustrating an example of efficient local normalization in accordance with one or more techniques of this disclosure.

FIG. 5 is a diagram 500 illustrating an example of efficient local normalization 502 in accordance with one or more techniques of this disclosure. A device (e.g., the device 104, the XR device 402) may generate/capture/obtain input left and right buffers 504 by way of the left camera 414 and the right camera 416, respectively. With more particularity, the input left and right buffers 504 may include an input left buffer 506 (i.e., a left image) captured by way of the left camera 414 and an input right buffer 508 (i.e., a right image) captured by way of the right camera 416. In an example, the input left buffer 506 and the input right buffer 508 may be captured/generated/obtained at the same time or close to the same time. An image buffer (e.g., the input left buffer 506, the input right buffer 508) may refer to image data for a display (e.g., the left display 408 or the right display 410) that is stored prior to display.

At 510, the device may determine (e.g., compute, calculate) a target granularity based on the input left buffer 506 and/or the input right buffer 508. The target granularity may be indicative of an image pyramid level (i.e., a level of a multum in parvo (MIP) pyramid). In an example, the device may determine the target granularity based on a width of the input left buffer 506 and/or the input right buffer 508, a height of the input left buffer 506 and/or the input right buffer 508, and/or a field of view (FOV) of the left camera 414 (and hence am FOV of the input left buffer 506) and/or the right camera 416 (and hence an FOV of the input right buffer 508). In one example, the device may determine the target granularity according to equation (I) below.

$$\text{Target Granularity} = \log_2(\max(inputWidth, inputHeight) + 1) - \max\left(4, \left(\frac{1}{90}\right) * FOV\right) + 3 \qquad \text{(I)}$$

In equation (I) above, "inputWidth" may refer to a width of the input left buffer 506 (or the input right buffer 508), "inputHeight" may refer to a height of the input left buffer 506 (or the input right buffer 508), and "FOV" may refer to a field of view of the left camera 414 (or the right camera 416). An FOV may refer to an angular extent of a scene that is observed at a given time.

Figure 6:
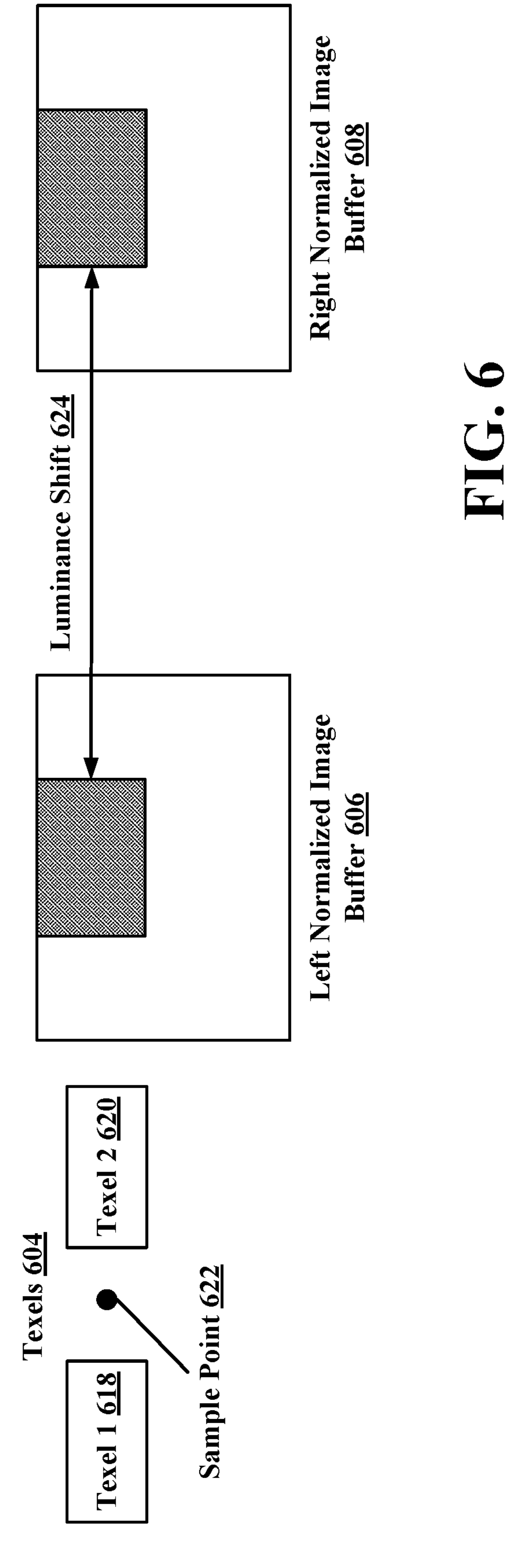
FIG. 6 is a diagram illustrating an example of a partial image pyramid, texels, a left normalized image buffer, and a right normalized image buffer in accordance with one or more techniques of this disclosure.

At 512, the device may generate a partial image pyramid (i.e., a partial MIP pyramid) down to the target granularity (i.e., based on the target granularity), where the partial image pyramid is generated based on the input left buffer 506 and the input right buffer 508. For example, the device may generate the partial image pyramid based on a series of successive bilinear sample operations, where each of the series of successive bilinear sample operations sample each pixel in the input left buffer 506 and the input right buffer 508. FIG. 6 is a diagram 600 illustrating an example of a partial image pyramid 602, texels 604, a left normalized image buffer 606, and a right normalized image buffer 608 in accordance with one or more techniques of this disclosure. An image pyramid may refer to a series of images, where each image in the series of images is at a progressively lower resolution than a previous image. A resolution may refer to a horizontal number of pixels and a vertical number of pixels in an image. A last image in an image pyramid may be a 1×1 resolution image. For instance, each image in the series of images may be ¼ of the resolution of the previous image. In an example in which an original image is 256×256 pixels, an image pyramid for the original image may include eight images: a 128×128 pixel image, a 64×64 pixel image, a 32×32 pixel image, a 16×16 pixel image, an 8×8 pixel image, a 4×4 pixel image, a 2×2 pixel image, and a 1×1 pixel image. A partial image pyramid may refer to an image pyramid in which a last image is not a 1×1 pixel image.

Referring now to FIG. 6, the partial image pyramid 602 may include a zeroth image 610 at a zeroth level 612 and a target image 614 at a target level 616. In an example, a level of an image pyramid (or a partial image pyramid) may refer to a resolution of an image in the pyramid, where lower levels may correspond to lower resolutions and where higher levels may correspond to higher resolutions. The partial image pyramid 602 may also include additional images as well (not depicted in FIG. 6). The target level 616 may be indicated by the target granularity determined at 510. In an example, the partial image pyramid 602 may be generated based on a 128×128 pixel image and the target level 616 may be 3, and hence the target image 614 may be a 16×16 pixel image. Each pixel in the target image 614 of the partial image pyramid 602 may correspond to a mean intensity value for a (larger) block of the input left buffer 506 and/or the input right buffer 508. The partial image pyramid 602 may correspond to 515 in FIG. 5.

Referring back to FIG. 5, the device may obtain local mean buffers 514 based on the partial image pyramid (e.g., based on a level determined by the target granularity), where the local mean buffers 514 may include a left local mean buffer 516 and a right local mean buffer 518. For instance, the device may sample the partial image pyramid based on the target granularity. In an example, the device may sample the partial image pyramid at a level (e.g., the target level 616) based on the target granularity. Each pixel in the left local mean buffer 516 may correspond to a mean intensity value for a (larger) block of the input left buffer 506 and each pixel in the right local mean buffer 518 may correspond to a mean intensity value for a (larger) block of the input right buffer 508.

At 520, the device may perform a local normalization on the input left buffer 506 and/or the input right buffer 508. For example, the device may sample a bilinear local mean from a target level of the partial image pyramid. The device may produce a continuous local mean value for each texel at a high resolution input buffer, as the texture coordinate on an input buffer may correspond to a fractional position in a local mean buffer. The fractional position may be used to produce a continuous local mean value via weighted interpolation of neighboring local mean texels. A texel may refer to a fundamental unit of a texture map. In some aspects, a “texel” may be referred to as a “texture pixel,” or vice versa. Referring to FIG. 6, the texels 604 may include a first texel 618 and a second texel 620, where the first texel 618 and the second texel 620 may be neighboring texels. The device may interpolate between the first texel 618 and the second texel 620 based on a fractional position of a sample point 622 between the first texel 618 and the second texel 620. The device may determine (e.g., compute, calculate) a midpoint normalization value based on the bilinear local mean. The midpoint normalization value may refer to a value determined (e.g., computed, calculated) with respect to local mean buffers that is indicative of a normalization to apply to at least one of a first input image buffer or a second input image buffer in order to mitigate or remove a luminance shift between the first input image buffer and the second input image buffer. The device may then normalize the input left buffer 506 and/or the input right buffer 508 based on the midpoint normalization value.

Performing the local normalization at 520 may generate normalized left and right image buffers 522, where the normalized left and right image buffers 522 may include a left normalized image buffer 524 and a right normalized image buffer 526. Referring back to FIG. 6, the left normalized image buffer 606 may be or include the left normalized image buffer 524 and the right normalized image buffer 526 may be or include the right normalized image buffer 608. A luminance shift 624 may exist between the left normalized image buffer 606 and the right normalized image buffer 608, where the luminance shift 624 may be less than the luminance shift 422. The device may perform DFS based on the left normalized image buffer 606 and the right normalized image buffer 608. The device may also present the left normalized image buffer 606 on a left display (e.g., the left display 408) and the right normalized image buffer 608 on a right display (e.g., the right display 410).

The technologies described herein may improve DFS quality in low light and low feature strength regions (i.e., low trackable feature strength regions) of images by preventing luminance deltas (i.e., differences) between the images from overshadowing trackable features in the images. The technologies described herein may utilize graphics processor hardware (e.g., GPU hardware) and fast paths to maintain high performance. For example, the graphics processor hardware may be used to determine (e.g., compute, calculate) a partial image pyramid (i.e., a partial MIP pyramid, a partial MIP chain) to find local means of image regions. The technologies described herein may utilize hardware bilinear interpolation to a target image pyramid level (i.e., a target IMP level) to smoothly interpolate between local regions of images, thus providing per-pixel local normalization. Furthermore, the technologies described herein may automatically handle variations in input surface dimensions and camera FOVs between images.

Figure 7:
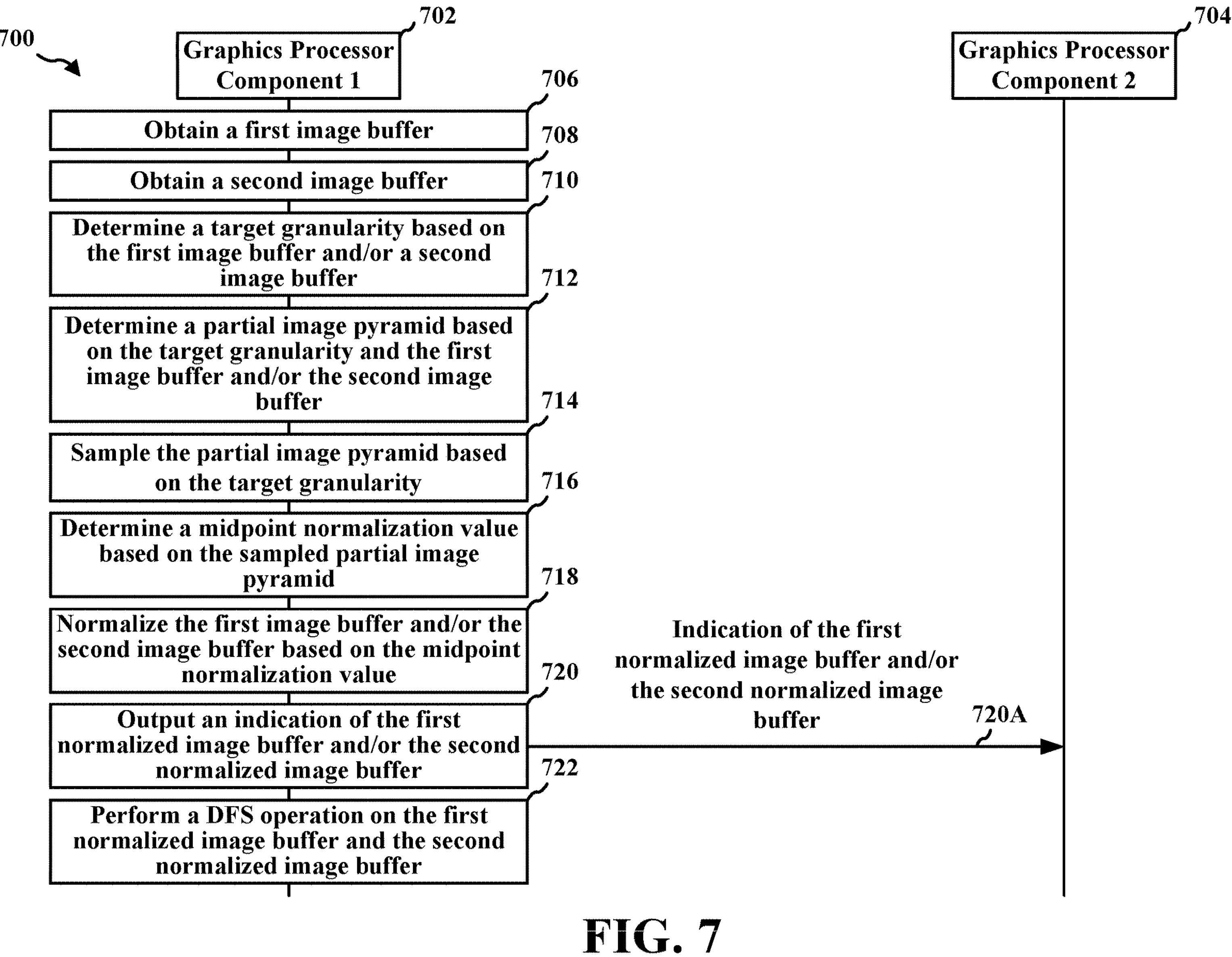
FIG. 7 is a call flow diagram illustrating example communications between a first graphics processor component and a second graphics processor component in accordance with one or more techniques of this disclosure.

FIG. 7 is a call flow diagram 700 illustrating example communications between a first graphics processor component 702 and a second graphics processor component 704 in accordance with one or more techniques of this disclosure. In an example, the first graphics processor component 702 and/or the second graphics processor component 704 may be included in the device 104 or the XR device 402.

At 710, the first graphics processor component 702 may determine (e.g., compute, calculate) a target granularity based on at least one of a first image buffer or a second image buffer. At 712, the first graphics processor component 702 may compute a partial image pyramid based on the target granularity and at least one of the first image buffer or the second image buffer. At 714, the first graphics processor component 702 may sample the partial image pyramid based on the target granularity. At 716, the first graphics processor component 702 may determine (e.g., compute, calculate) a midpoint normalization value based on the sampled partial image pyramid. At 718, the first graphics processor component 702 may normalize at least one of the first image buffer or the second image buffer based on the midpoint normalization value. At 720, the first graphics processor component 702 may output an indication of at least one of the first normalized image buffer or the second normalized image buffer. For instance, at 720A, the first graphics processor component 702 may transmit (e.g., to the second graphics processor component 704) the indication of at least one of the first normalized image buffer or the second normalized image buffer In one aspect, at 706, the first graphics processor component 702 may obtain, via a first camera at a first position, the first image buffer. At 708, the first graphics processor component 702 may obtain, via a second camera at a second position, the second image buffer. In one aspect, at 722, the first graphics processor component 702 may perform a depth from stereo (DFS) operation on the first normalized image buffer and the second normalized image buffer.

Figure 8:
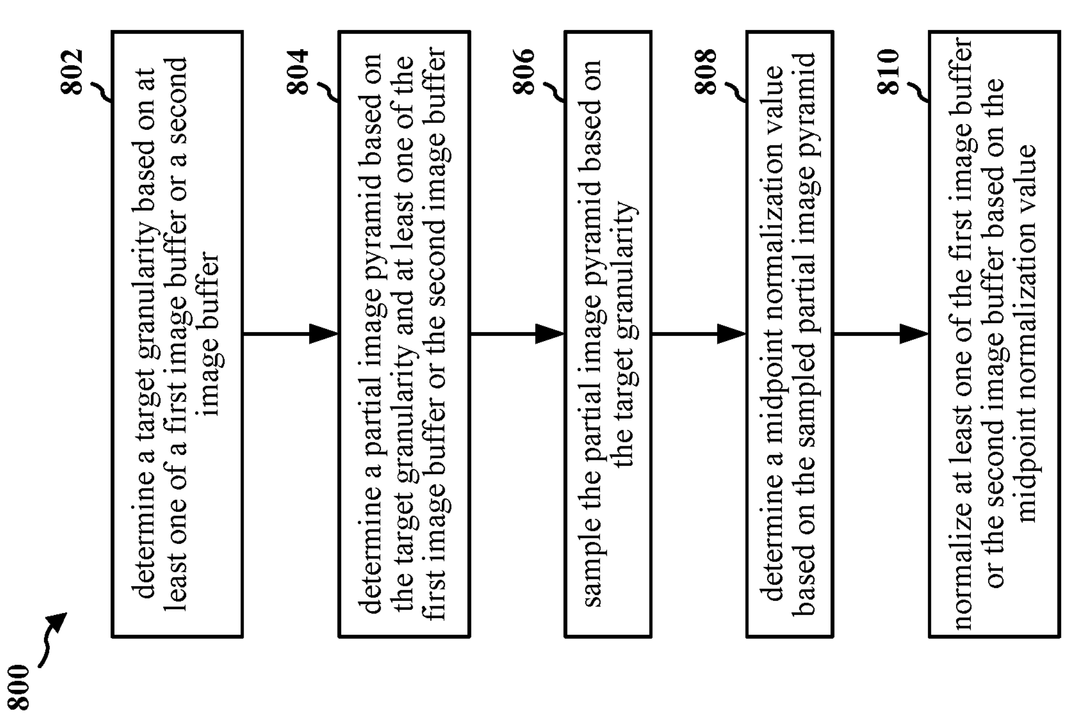
FIG. 8 is a flowchart of an example method of display processing in accordance with one or more techniques of this disclosure.

FIG. 8 is a flowchart 800 of an example method of display processing in accordance with one or more techniques of this disclosure. The method may be performed by an apparatus, such as an apparatus for display processing, a graphics processor (e.g., a GPU), software run on shader code at a graphics processor, a CPU, the device 104, the XR device 402, a wireless communication device, and the like, as used in connection with the aspects of FIGS. 1-7. The method may be associated with various advantages, such as improving DFS quality in low light and low feature strength regions of an image by preventing luminance deltas from overshadowing trackable features. In an example, the method may be performed by the local normalizer 198.

At 802, the apparatus (e.g., a graphics processor) determines (e.g., computes, calculates) a target granularity based on at least one of a first image buffer or a second image buffer. For example, FIG. 7 at 710 shows that the first graphics processor component 702 may determine a target granularity based on at least one of a first image buffer or a second image buffer. In an example, determining the target granularity may correspond to 510 in FIG. 5. In an example, the target granularity may be calculated according to equation (I) above. In an example, the first image buffer may be the input left buffer 506 and the right image buffer may be the input right buffer 508. In an example, 802 may be performed by the local normalizer 198.

At 804, the apparatus (e.g., a graphics processor) determines (e.g., computes, calculates) a partial image pyramid based on the target granularity and at least one of the first image buffer or the second image buffer. For example, FIG. 7 at 712 shows that the first graphics processor component 702 may compute a partial image pyramid based on the target granularity and at least one of the first image buffer or the second image buffer. In an example, determining the partial image pyramid may correspond to 512 in FIG. 5. In an example, the partial image pyramid may be or include the partial image pyramid 602. In an example, 804 may be performed by the local normalizer 198.

At 806, the apparatus (e.g., a graphics processor) samples the partial image pyramid based on the target granularity. For example, FIG. 7 at 714 shows that the first graphics processor component 702 may sample the partial image pyramid based on the target granularity. In an example, the first graphics processor component 702 may sample the partial image pyramid at a level (e.g., the target level 616). In an example, sampling the partial image pyramid may be associated with the local mean buffers 514. In an example, 806 may be performed by the local normalizer 198

At 808, the apparatus (e.g., a graphics processor) determines (e.g., computes, calculates) a midpoint normalization value based on the sampled partial image pyramid. For example, FIG. 7 at 716 shows that the first graphics processor component 702 may determine a midpoint normalization value based on the sampled partial image pyramid. In an example, 808 may be performed by the local normalizer 198

At 810, the apparatus (e.g., a graphics processor) normalizes at least one of the first image buffer or the second image buffer based on the midpoint normalization value. For example, FIG. 7 at 718 shows that the first graphics processor component 702 may normalize at least one of the first image buffer or the second image buffer based on the midpoint normalization value. Normalizing at least one of the first image buffer or the second image buffer may correspond to 520 in FIG. 5. In an example, normalizing at least one of the first image buffer or the second image buffer may produce the left normalized image buffer 524 and/or the right normalized image buffer 526. In another example, normalizing at least one of the first image buffer or the second image buffer may produce the left normalized image buffer 606 and/or the right normalized image buffer 608. In an example, 810 may be performed by the local normalizer 198.

FIG. 9 is a flowchart 900 of an example method of display processing in accordance with one or more techniques of this disclosure. The method may be performed by an apparatus, such as an apparatus for display processing, a graphics processor (e.g., a GPU), software run on shader code at a GPU, a CPU, the device 104, the XR device 402, a wireless communication device, and the like, as used in connection with the aspects of FIGS. 1-7. The method may be associated with various advantages, such as improving DFS quality in low light and low feature strength regions of an image by preventing luminance deltas from overshadowing trackable features. In an example, the method (including the various aspects detailed below) may be performed by the local normalizer 198.

At 906, the apparatus (e.g., a graphics processor) determines (e.g., computes, calculates) a target granularity based on at least one of a first image buffer or a second image buffer. For example, FIG. 7 at 710 shows that the first graphics processor component 702 may determine a target granularity based on at least one of a first image buffer or a second image buffer. In an example, determining the target granularity may correspond to 510 in FIG. 5. In an example, the target granularity may be determined according to equation (I) above. In an example, the first image buffer may be the input left buffer 506 and the right image buffer may be the input right buffer 508. In an example, 906 may be performed by the local normalizer 198.

At 908, the apparatus (e.g., a graphics processor) determines (e.g., computes, calculates) a partial image pyramid based on the target granularity and at least one of the first image buffer or the second image buffer. For example, FIG. 7 at 712 shows that the first graphics processor component 702 may determine a partial image pyramid based on the target granularity and at least one of the first image buffer or the second image buffer. In an example, determining the partial image pyramid may correspond to 512 in FIG. 5. In an example, the partial image pyramid may be or include the partial image pyramid 602. In an example, 908 may be performed by the local normalizer 198.

At 910, the apparatus (e.g., a graphics processor) samples the partial image pyramid based on the target granularity. For example, FIG. 7 at 714 shows that the first graphics processor component 702 may sample the partial image pyramid based on the target granularity. In an example, the first graphics processor component 702 may sample the partial image pyramid at a level (e.g., the target level 616). In an example, sampling the partial image pyramid may be associated with the local mean buffers 514. In an example, 910 may be performed by the local normalizer 198.

At 912, the apparatus (e.g., a graphics processor) determines (e.g., computes, calculates) a midpoint normalization value based on the sampled partial image pyramid. For example, FIG. 7 at 716 shows that the first graphics processor component 702 may determine a midpoint normalization value based on the sampled partial image pyramid. In an example, 912 may be performed by the local normalizer 198.

At 914, the apparatus (e.g., a graphics processor) normalizes at least one of the first image buffer or the second image buffer based on the midpoint normalization value. For example, FIG. 7 at 718 shows that the first graphics processor component 702 may normalize at least one of the first image buffer or the second image buffer based on the midpoint normalization value. Normalizing at least one of the first image buffer or the second image buffer may correspond to 520 in FIG. 5. In an example, normalizing at least one of the first image buffer or the second image buffer may produce the left normalized image buffer 524 and/or the right normalized image buffer 526. In another example, normalizing at least one of the first image buffer or the second image buffer may produce the left normalized image buffer 606 and/or the right normalized image buffer 608. In an example, 914 may be performed by the local normalizer 198.

In one aspect, sampling the partial image pyramid based on the target granularity may include: sampling the partial image pyramid at a level based on the target granularity. For example, FIG. 7 at 714 shows that the first graphics processor component 702 may sample the partial image pyramid at the level based on the target granularity.

In one aspect, sampling the partial image pyramid based on the target granularity may further include: interpolating between a plurality of neighboring texels on the partial image pyramid based on a fractional position of a sample point between the plurality of neighboring texels. For example, sampling the partial image pyramid based on the target granularity at 714 may further include: interpolating between a plurality of neighboring texels on the partial image pyramid based on a fractional position of a sample point between the plurality of neighboring texels. In another example, the plurality of neighboring texels may be or include the texels 604 and the sample point may be the sample point 622.

In one aspect, the partial image pyramid may be a partial multum in parvo (MIP) pyramid. For example, the partial image pyramid determined at 712 may be a partial multum in parvo (MIP) pyramid. In another example, the partial image pyramid generated at 512 may be a partial multum in parvo (MIP) pyramid.

In one aspect, the first image buffer may be a left image buffer and the second image buffer may be a right image buffer. For example, the first image buffer may be the input left buffer 506 and the second image buffer may be the input right buffer 508.

In one aspect, determining the target granularity based on at least one of the first image buffer or the second image buffer may include determining the target granularity based on at least one of a width or a height of at least one of the first image buffer or the second image buffer. For example, determining the target granularity based on at least one of the first image buffer or the second image buffer at 710 may include determining the target granularity based on at least one of a width or a height of at least one of the input left buffer 506 or the input right buffer 508.

In one aspect, determining the target granularity based on at least one of the width or the height of at least one of the first image buffer or the second image buffer may include determining the target granularity based on a camera field of view (FOV) associated with at least one of the first image buffer or the second image buffer. For example, determining the target granularity at 710 based on at least one of the width or the height of at least one of the first image buffer or the second image buffer may include determining the target granularity based on a camera field of view (FOV) associated with at least one of the input left buffer 506 or the input right buffer 508. In an example, the camera FOV may be associated with the left camera 414 and/or the right camera 416.

In one aspect, the midpoint normalization value may include a bilinear local mean value associated with the level of the partial image pyramid. For example, the midpoint normalization value determined at 716 may include a bilinear local mean value associated with the level of the partial image pyramid.

In one aspect, at 916, the apparatus (e.g., a graphics processor) may output an indication of at least one of the first normalized image buffer or the second normalized image buffer. For example, FIG. 7 at 720 shows that the first graphics processor component 702 may output an indication of at least one of the first normalized image buffer or the second normalized image buffer. In an example, the first normalized image buffer may be the left normalized image buffer 606 and the second normalized image buffer may be the right normalized image buffer 608. In an example, 916 may be performed by the local normalizer 198.

In one aspect, outputting the indication of at least one of the first normalized image buffer or the second normalized image buffer may include: transmitting the indication of at least one of the first normalized image buffer or the second normalized image buffer. For example, FIG. 7 at 720A shows that outputting the indication of at least one of the first normalized image buffer or the second normalized image buffer may include: transmitting the indication of at least one of the first normalized image buffer or the second normalized image buffer. In an example, the indication may be transmitted to the second graphics processor component 704.

In one aspect, outputting the indication of at least one of the first normalized image buffer or the second normalized image buffer may include: storing, in at least one of a memory, a buffer, or a cache, the indication of at least one of the first normalized image buffer or the second normalized image buffer. For example, outputting the indication of at least one of the first normalized image buffer or the second normalized image buffer at 720 may include: storing, in at least one of a memory, a buffer, or a cache, the indication of at least one of the first normalized image buffer or the second normalized image buffer.

In one aspect, at 918, the apparatus (e.g., a graphics processor) may perform a depth from stereo (DFS) operation on the first normalized image buffer and the second normalized image buffer. For example, FIG. 7 at 722 shows that the first graphics processor component 702 may perform a depth from stereo (DFS) operation on the first normalized image buffer and the second normalized image buffer. In an example, 918 may be performed by the local normalizer 198.

In one aspect, at 902, the apparatus (e.g., a graphics processor) may obtain, via a first camera at a first position, the first image buffer. For example, FIG. 7 at 706 shows that the first graphics processor component 702 may obtain, via a first camera at a first position, the first image buffer. In an example, the first camera may be the left camera 414. In an example, 902 may be performed by the local normalizer 198.

In one aspect, at 904, the apparatus (e.g., a graphics processor) may obtain, via a second camera at a second position, the second image buffer. For example, FIG. 7 at 708 shows that the first graphics processor component 702 may obtain, via a second camera at a second position, the second image buffer. In an example, the second camera may be the right camera 416. In an example, 904 may be performed by the local normalizer 198.

In one aspect, the first image buffer and the second image buffer may be associated with a first luminance shift, where the first normalized image buffer and the second normalized image buffer may be associated with a second luminance shift, and where the second luminance shift may be less than the first luminance shift. For example, the first luminance shift may be the luminance shift 422 and the second luminance shift may be the luminance shift 624.

In one aspect, at least one of the first image buffer or the second image buffer may be associated with extended reality (XR) content, and where the first camera and the second camera may be included in an XR device. For example, the XR device may be or include the XR device 402. In an example, the input left buffer 506 and/or the input right buffer 508 may be associated with XR content.

In one aspect, determining the midpoint normalization value based on the sampled partial image pyramid may include determining a local midpoint normalization value for a region associated with at least one of the first image buffer or the second image buffer, and where normalizing at least one of the first image buffer or the second image buffer may include normalizing the region associated with at least one of the first image buffer or the second image buffer. For example, determining the midpoint normalization value at 716 may include determining a local midpoint normalization value for a region associated with at least one of the first image buffer or the second image buffer and normalizing at least one of the first image buffer or the second image buffer at 718 may include normalizing the region associated with at least one of the first image buffer or the second image buffer. In an example, the region may be a region of the left image buffer 404 associated with the first luminance level 418 and/or a region of the right image buffer 406 associated with the second luminance level 420 as illustrated in FIG. 4.

In one aspect, at least one of the first image buffer or the second image buffer may correspond to a first resolution, where the level of the image pyramid may include an image corresponding to a second resolution that is less than the first resolution, and where each pixel of the image may correspond to a mean intensity value for a region of at least one of the first image buffer or the second image buffer. For example, the input left buffer 506 and/or the input right buffer 508 may correspond to a first resolution, and the target image 614 may correspond to a second resolution that is less than the first resolution. In another example, each pixel of the target image 614 may correspond to a mean intensity value for a region of input left buffer 506 and/or the input right buffer 508.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for determining a target granularity based on at least one of a first image buffer or a second image buffer. The apparatus may further include means for determining a partial image pyramid based on the target granularity and at least one of the first image buffer or the second image buffer. The apparatus may further include means for sampling the partial image pyramid based on the target granularity. The apparatus may further include means for determining a midpoint normalization value based on the sampled partial image pyramid. The apparatus may further include means for normalizing at least one of the first image buffer or the second image buffer based on the midpoint normalization value. The apparatus may further include means for outputting an indication of at least one of the first normalized image buffer or the second normalized image buffer. The apparatus may further include means for performing a depth from stereo (DFS) operation on the first normalized image buffer and the second normalized image buffer. The apparatus may further include means for obtaining, via a first camera at a first position, the first image buffer. The apparatus may further include means for obtaining, via a second camera at a second position, the second image buffer.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A. B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of display processing, including: determining a target granularity based on at least one of a first image buffer or a second image buffer; determining a partial image pyramid based on the target granularity and at least one of the first image buffer or the second image buffer; sampling the partial image pyramid based on the target granularity; determining a midpoint normalization value based on the sampled partial image pyramid; and normalizing at least one of the first image buffer or the second image buffer based on the midpoint normalization value.

Aspect 2 may be combined with aspect 1, wherein sampling the partial image pyramid based on the target granularity includes: sampling the partial image pyramid at a level based on the target granularity; and interpolating between a plurality of neighboring texels on the partial image pyramid based on a fractional position of a sample point between the plurality of neighboring texels.

Aspect 3 may be combined with any of aspects 1-2, wherein the partial image pyramid is a partial multum in parvo (MIP) pyramid.

Aspect 4 may be combined with any of aspects 1-3, wherein the first image buffer is a left image buffer and the second image buffer is a right image buffer.

Aspect 5 may be combined with any of aspects 1-4, wherein determining the target granularity based on at least one of the first image buffer or the second image buffer includes determining the target granularity based on at least one of a width or a height of at least one of the first image buffer or the second image buffer.

Aspect 6 may be combined with aspect 5, wherein determining the target granularity based on at least one of the width or the height of at least one of the first image buffer or the second image buffer includes determining the target granularity based on a camera field of view (FOV) associated with at least one of the first image buffer or the second image buffer.

Aspect 7 may be combined with any of aspects 1-6, wherein the midpoint normalization value includes a bilinear local mean value associated with the level of the partial image pyramid.

Aspect 8 may be combined with any of aspects 1-7, further including: outputting an indication of at least one of the first normalized image buffer or the second normalized image buffer.

Aspect 9 may be combined with aspect 8, wherein outputting the indication of at least one of the first normalized image buffer or the second normalized image buffer includes: transmitting the indication of at least one of the first normalized image buffer or the second normalized image buffer; or storing, in at least one of a memory, a buffer, or a cache, the indication of at least one of the first normalized image buffer or the second normalized image buffer.

Aspect 10 may be combined with any of aspects 1-9, further including: performing a depth from stereo (DFS) operation on the first normalized image buffer and the second normalized image buffer.

Aspect 11 may be combined with any of aspects 1-10, further including: obtaining, via a first camera at a first position, the first image buffer; and obtaining, via a second camera at a second position, the second image buffer.

Aspect 12 may be combined with aspect 11, wherein the first image buffer and the second image buffer are associated with a first luminance shift, wherein the first normalized image buffer and the second normalized image buffer are associated with a second luminance shift, and wherein the second luminance shift is less than the first luminance shift.

Aspect 13 may be combined with any of aspects 11-12, wherein at least one of the first image buffer or the second image buffer is associated with extended reality (XR) content, and wherein the first camera and the second camera are included by an XR device.

Aspect 14 may be combined with any of aspects 1-13, wherein determining the midpoint normalization value based on the sampled partial image pyramid includes determining a local midpoint normalization value for a region associated with at least one of the first image buffer or the second image buffer, and wherein normalizing at least one of the first image buffer or the second image buffer includes normalizing the region associated with at least one of the first image buffer or the second image buffer.

Aspect 15 may be combined with any of aspects 1-14, wherein at least one of the first image buffer or the second image buffer correspond to a first resolution, wherein the level of the image pyramid includes an image corresponding to a second resolution that is less than the first resolution, and wherein each pixel of the image corresponds to a mean intensity value for a region of at least one of the first image buffer or the second image buffer.

Aspect 16 is an apparatus for display processing comprising a processor coupled to a memory and, based on information stored in the memory, the processor is configured to implement a method as in any of aspects 1-15.

Aspect 17 may be combined with aspect 16 and comprises that the apparatus is a wireless communication device comprising at least one of a transceiver or an antenna coupled to the processor.

Aspect 18 is an apparatus for display processing comprising means for implementing a method as in any of aspects 1-15.

Aspect 19 is a computer-readable medium (e.g., a non-transitory computer readable-medium) storing computer executable code, the computer executable code, when executed by a processor, causes the processor to implement a method as in any of aspects 1-15.

Various aspects have been described herein. These and other aspects are within the scope of the following claims.

What is claimed is:

1. An apparatus for display processing, comprising:

a memory; and a processor coupled to the memory and, based on information stored in the memory, the processor is configured to:

determine a target granularity based on at least one of a first image buffer or a second image buffer;

determine a partial image pyramid based on the target granularity and at least one of the first image buffer or the second image buffer;

sample the partial image pyramid based on the target granularity;

determine a midpoint normalization value based on the sampled partial image pyramid; and normalize at least one of the first image buffer or the second image buffer based on the midpoint normalization value.

2. The apparatus of claim 1, wherein to sample the partial image pyramid based on the target granularity, the processor is configured to:

sample the partial image pyramid at a level based on the target granularity; and interpolate between a plurality of neighboring texels on the partial image pyramid based on a fractional position of a sample point between the plurality of neighboring texels.

3. The apparatus of claim 1, wherein the partial image pyramid is a partial multum in parvo (MIP) pyramid.

4. The apparatus of claim 1, wherein the first image buffer is a left image buffer and the second image buffer is a right image buffer.

5. The apparatus of claim 1, wherein to determine the target granularity based on at least one of the first image buffer or the second image buffer, the processor is configured to determine the target granularity based on at least one of a width or a height of at least one of the first image buffer or the second image buffer.

6. The apparatus of claim 5, wherein to determine the target granularity based on at least one of the width or the height of at least one of the first image buffer or the second image buffer, the processor is configured to determine the target granularity based on a camera field of view (FOV) associated with at least one of the first image buffer or the second image buffer.

7. The apparatus of claim 1, wherein the midpoint normalization value comprises a bilinear local mean value associated with a level of the partial image pyramid.

8. The apparatus of claim 1, wherein the processor is further configured to:

output an indication of at least one of the first normalized image buffer or the second normalized image buffer.

9. The apparatus of claim 8, wherein to output the indication of at least one of the first normalized image buffer or the second normalized image buffer, the processor is configured to:

transmit the indication of at least one of the first normalized image buffer or the second normalized image buffer; or store, in at least one of the memory, a buffer, or a cache, the indication of at least one of the first normalized image buffer or the second normalized image buffer.

10. The apparatus of claim 1, wherein the processor is further configured to:

perform a depth from stereo (DFS) operation on the first normalized image buffer and the second normalized image buffer.

11. The apparatus of claim 1, wherein the processor is further configured to:

obtain, via a first camera at a first position, the first image buffer; and obtain, via a second camera at a second position, the second image buffer.

12. The apparatus of claim 11, wherein the first image buffer and the second image buffer are associated with a first luminance shift, wherein the first normalized image buffer and the second normalized image buffer are associated with a second luminance shift, and wherein the second luminance shift is less than the first luminance shift.

13. The apparatus of claim 11, wherein at least one of the first image buffer or the second image buffer is associated with extended reality (XR) content, and wherein the first camera and the second camera are comprised by an XR device.

14. The apparatus of claim 1, wherein to determine the midpoint normalization value based on the sampled partial image pyramid, the processor is configured to determine a local midpoint normalization value for a region associated with at least one of the first image buffer or the second image buffer, and wherein to normalize at least one of the first image buffer or the second image buffer, the processor is configured to normalize the region associated with at least one of the first image buffer or the second image buffer.

15. The apparatus of claim 1, wherein at least one of the first image buffer or the second image buffer correspond to a first resolution, wherein a level of the image pyramid comprises an image corresponding to a second resolution that is less than the first resolution, and wherein each pixel of the image corresponds to a mean intensity value for a region of at least one of the first image buffer or the second image buffer.

16. The apparatus of claim 1, wherein the apparatus is a wireless communication device comprising at least one of a transceiver or an antenna coupled to the processor.

17. A method of display processing, comprising:

determining a target granularity based on at least one of a first image buffer or a second image buffer;

determining a partial image pyramid based on the target granularity and at least one of the first image buffer or the second image buffer;

sampling the partial image pyramid based on the target granularity;

determining a midpoint normalization value based on the sampled partial image pyramid; and normalizing at least one of the first image buffer or the second image buffer based on the midpoint normalization value.

18. The method of claim 17, wherein sampling the partial image pyramid based on the target granularity comprises:

sampling the partial image pyramid at a level based on the target granularity; and interpolating between a plurality of neighboring texels on the partial image pyramid based on a fractional position of a sample point between the plurality of neighboring texels.

19. The method of claim 17, wherein the partial image pyramid is a partial multum in parvo (MIP) pyramid.

20. The method of claim 17, wherein the first image buffer is a left image buffer and the second image buffer is a right image buffer.

21. The method of claim 17, wherein determining the target granularity based on at least one of the first image buffer or the second image buffer comprises determining the target granularity based on at least one of a width or a height of at least one of the first image buffer or the second image buffer.

22. The method of claim 21, wherein determining the target granularity based on at least one of the width or the height of at least one of the first image buffer or the second image buffer comprises determining the target granularity based on a camera field of view (FOV) associated with at least one of the first image buffer or the second image buffer.

23. The method of claim 17, wherein the midpoint normalization value comprises a bilinear local mean value associated with a level of the partial image pyramid.

24. The method of claim 17, further comprising:
outputting an indication of at least one of the first normalized image buffer or the second normalized image buffer.

25. The method of claim 24, wherein outputting the indication of at least one of the first normalized image buffer or the second normalized image buffer comprises:
transmitting the indication of at least one of the first normalized image buffer or the second normalized image buffer; or
storing, in at least one of a memory, a buffer, or a cache, the indication of at least one of the first normalized image buffer or the second normalized image buffer.

26. The method of claim 17, further comprising:
performing a depth from stereo (DFS) operation on the first normalized image buffer and the second normalized image buffer.

27. The method of claim 17, further comprising:
obtaining, via a first camera at a first position, the first image buffer; and
obtaining, via a second camera at a second position, the second image buffer.

28. The method of claim 27, wherein the first image buffer and the second image buffer are associated with a first luminance shift, wherein the first normalized image buffer and the second normalized image buffer are associated with a second luminance shift, and wherein the second luminance shift is less than the first luminance shift.

29. The method of claim 27, wherein at least one of the first image buffer or the second image buffer is associated with extended reality (XR) content, and wherein the first camera and the second camera are comprised by an XR device.

30. A non-transitory computer-readable medium storing computer executable code, the computer executable code, when executed by a processor, causes the processor to:
determine a target granularity based on at least one of a first image buffer or a second image buffer;
determine a partial image pyramid based on the target granularity and at least one of the first image buffer or the second image buffer;
sample the partial image pyramid based on the target granularity;
determine a midpoint normalization value based on the sampled partial image pyramid; and
normalize at least one of the first image buffer or the second image buffer based on the midpoint normalization value.

* * * * *